Sept. 5, 1950 K. M. NEWCOMER 2,521,646
LIQUID MIXING VALVE

Filed July 27, 1949 2 Sheets-Sheet 1

INVENTOR.
Keepers M. Newcomer
BY Victor J. Evans & Co.
ATTORNEYS

Sept. 5, 1950          K. M. NEWCOMER          2,521,646
LIQUID MIXING VALVE
Filed July 27, 1949                                 2 Sheets-Sheet 2
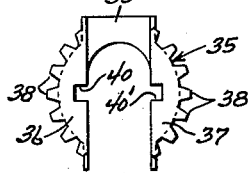
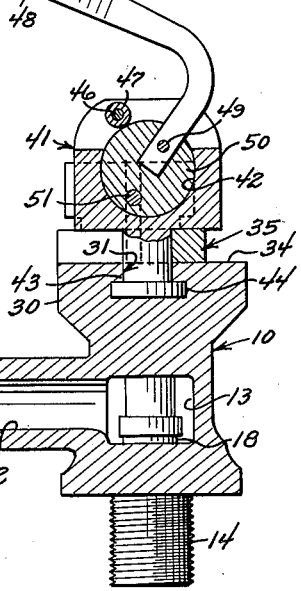
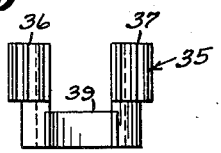
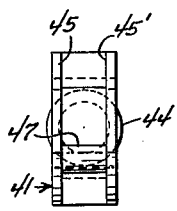
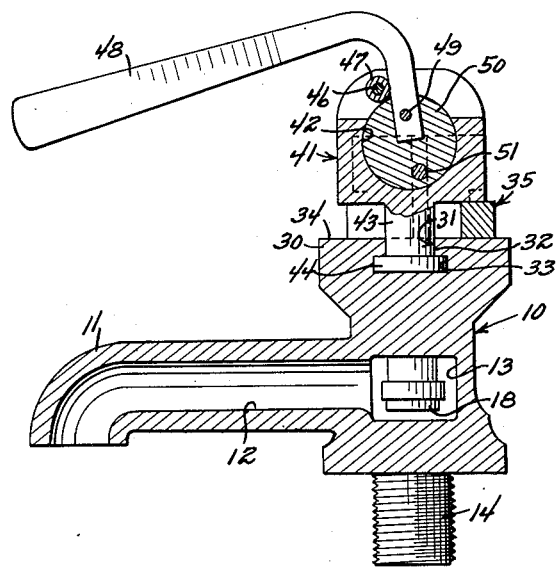
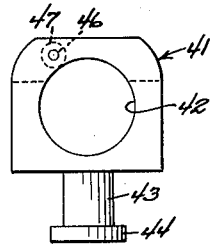
INVENTOR.
Keepers M. Newcomer
BY Victor J. Evans & Co.
ATTORNEYS Patented Sept. 5, 1950

2,521,646

UNITED STATES PATENT OFFICE 2,521,646

LIQUID MIXING VALVE

Keepers M. Newcomer, Pittsburgh, Pa.

Application July 27, 1949, Serial No. 107,003

5 Claims. (Cl. 277—18)

This invention relates to a valve, and more particularly to a valve for dispensing liquids, such as hot and cold water.

The object of the invention is to provide a manually operable valve wherein a pair of separate streams, such as hot and cold water, can be mixed and dispensed as a single stream.

Another object of the invention is to provide a valve which is connected to a pair of liquid supply sources of different temperatures, and wherein the valve is manually operated to dispense a single stream of liquid of any desired temperature and volume.

Still another object of the invention is to provide a liquid mixing valve wherein a novel gear arrangement is operatively connected to an actuating lever, the gear arrangement being so constructed that excessive pressure thereon is prevented.

A further object of the invention is to provide a liquid mixing valve which is extremely simple and inexpensive to manufacture.

Other objects and advantages will be apparent during the course of the following description.

In the accompanying drawings, forming a part of this application, and in which like numerals are used to designate like parts throughout the same:

Figure 5 is a sectional view taken on the line 5—5 of Figure 1;

Figure 6 is a sectional view taken on the line 6—6 of Figure 2;

Figure 7 is a top plan view of the split gear;

Figure 8 is an end elevational view of the split gear of Figure 7;

Figure 9 is a top plan view of the turn table;

Figure 10 is a side elevational view of the turn table of Figure 9.

Figure 1:
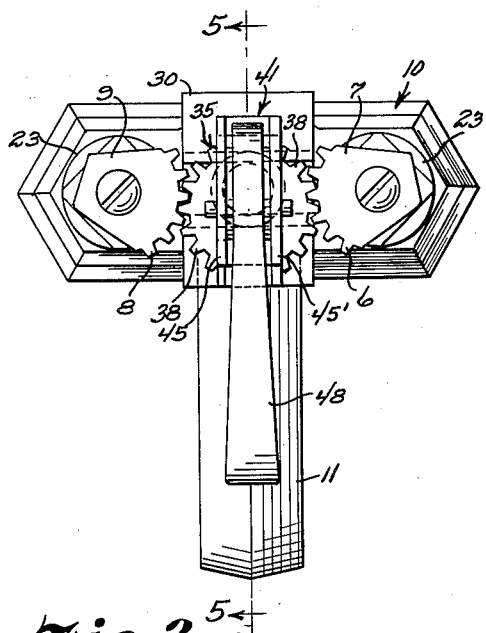
Figure 1 is a top plan view of the liquid mixing valve, with the hand lever in the raised position and closing both inlet ports.

Referring in detail to the drawings, the numeral 10 designates a hollow body which has a pouring spout 11 projecting therefrom. The pouring spout 11 is provided with a passageway 12 therein and the passageway 12 communicates with a mixing cavity 13 which is arranged in the body 10.

Arranged in threaded engagement with the bottom of the body 10 is a pair of exteriorly threaded nipples 14 and 15 which are adapted to be connected to separate sources of liquid, such as hot and cold water. Water passes from a source of supply through the nipple 14, then through a port 16 and into the valve cavity 13. Similarly, the other stream of water is adapted to flow through the other nipple 15, then through a port 17 and into the cavity 13. A valve 18 is mounted for movement into and out of closing relation with respect to the port 16, and the valve 18 has a stem 19 secured thereto. Likewise, a valve 20 is mounted for movement into and out of closing relation with respect to the other port 17, the valve 20 having a stem 21 secured thereto. Each of the stems 19 and 21 projects through a bonnet 23, the bonnet 23 being arranged in threaded engagement with projecting necks 24 which are formed integral with the valve body 10. Suitable washers 25, Figure 3, are circumposed on the valve stems 19 and 21 for insuring a fluid tight connection or seal between the bonnet, valve stems and body 10.

Figure 3:
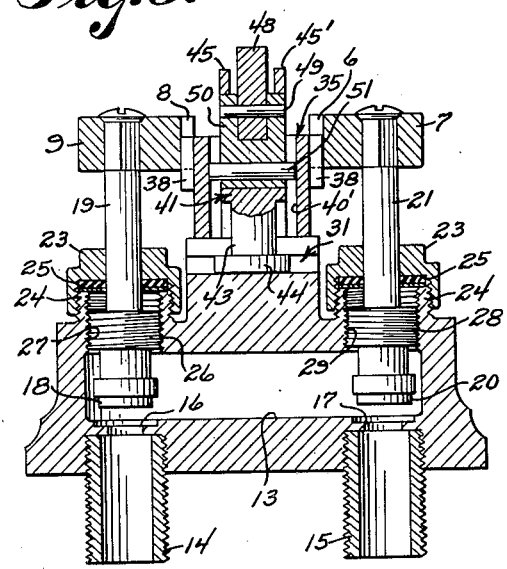
Figure 3 is a sectional view taken on the line 3—3 of Figure 2.

The stem 19 is provided with a plurality of exterior threads 26, Figure 3, and the threads 26 are arranged in engagement with an interiorly threaded bore 27 which is formed in the body 10. Similarly, the other stem 21 is provided with a plurality of exterior threads 28 which are arranged in threaded engagement with an interiorly threaded bore 29. The threads 28 and the threads 26 extend in reverse or opposite directions, so that the valves 28 and 20 can be simultaneously opened and closed.

The upper end of the body 10 is enlarged as at 30, and the upper end of the body is provided with a slot 31 which has an inverted T-shape. Thus, the slot 31 includes a first portion 32 which communicates with a wide portion 33, Figures 5 and 6. The upper end of the body 10 is also provided with a flat bearing surface 34 and slidably supported on the bearing surface 34 is a split gear 35, Figure 7. The split gear 35 includes a pair of spaced ears 36 and 37 which each have gear teeth 38 thereon. The gears 36 and 37 are connected by a transverse portion 39 and the ears 36 and 37 are provided with opposed slots 40 and 40' for a purpose to be later described.

The ears 36 and 37 of the split gear 35 slidably embrace a turn table or bracket 41, the turn table 41 having a circular opening 42 therein. The turn table 41 further has a post 43 projecting from its lower end and the post 43 projects through the portion 32 of the T-shaped slot 31. Formed integral with the lower end of the post 43 or secured thereto is an annular head 44 which seats in the wide portion 33 of the slot 31. The turn table 41 has a pair of spaced parallel side walls 45 and 45' projecting upwardly therefrom, and a pin extends between the side walls 45 and 45' and is supported thereby. A sleeve 47 is supported on the pin 46, and the sleeve 47 is adapted to be contacted by an actuating lever 48, the sleeve 47 serving to limit downward movement of the lever 48.

An end of the manually operable actuating lever 48 projects into a cylindrical roller 50, there being a pin 49 securing the end of the lever 48 to the roller 50. The roller 50 is rotatably arranged in the opening 42 in the turn table 41. Carried by the roller 50 and arranged off center with respect to the roller 50 is a pin 51. The ends of the pin project beyond the sides of the roller 50. One end of the pin 51 seats in one of the slots 40 in the split gear 35, and the other end of the pin 51 seats in the other slot 40' in the split gear 35.

The operation of the liquid mixing valve is as follows:

The nipple 14 is connected to a suitable source of liquid, such as cold water, while the other nipple 15 is connected to a liquid source of supply, such as hot water. Then, it will be seen that by raising the actuating lever 48 upwardly, the valves 18 and 20 both move into closing relation with respect to the ports 16 and 17 as shown in Figures 1 and 5 so that no water or liquid can flow into the cavity 13. This closing action of the valves 18 and 20 occurs because as the lever 48 is raised, it causes the roller 50 to rotate. Then, since the pin 51 is carried by the roller 50 and since the pin 51 projects into the slots 40 and 40' in the split gear 35, the split gear 35 will be slid or moved forwardly. As the split gear 35 moves forwardly, it rotates both of the stems 19 and 21 to move the valve 18 and valve 20 into closing relation with respect to the ports 16 and 17. This rotation of the stems 19 and 21 is caused by the novel gear arrangement of the liquid mixing valve. The gear arrangement includes a gear 9 which is secured to the upper end of the stem 19, and the gear 9 has teeth 8 thereon which mesh with the teeth 38 on the gear 36. A similar gear 7 is secured to the upper end of the other stem 21, and the gear 7 has teeth 6 thereon which mesh with the teeth 38 on the gear 37 of the split gear 35. Thus, it will be seen that as the split 35 is moved forwardly by raising the lever 48, the gears 9 and 7 will be rotated to thereby rotate the stems 19 and 21 in opposite directions to cause the valves 18 and 20 to move into closing relation with respect to the ports 16 and 17.

Figure 2:
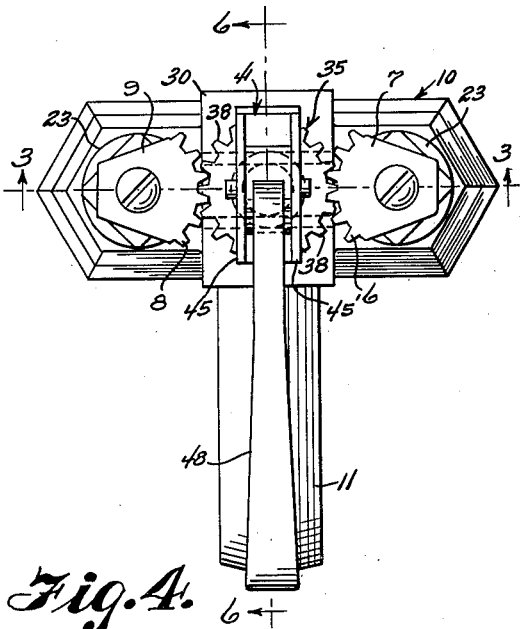
Figure 2 is a top plan view of the valve, with the hand lever in lowered position and opening both inlet ports.
Figure 4:
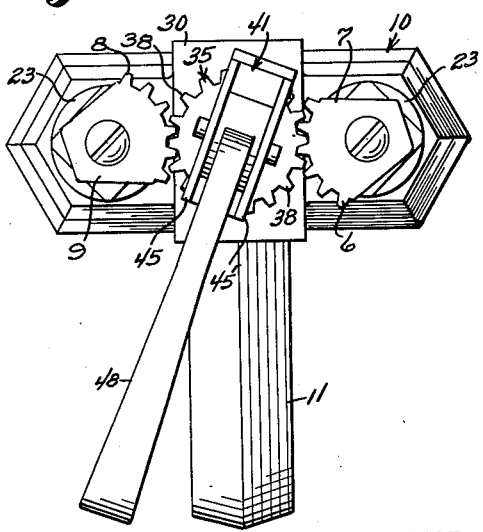
Figure 4 is a view similar to Figure 2, but with the hand lever rotated so as to close one inlet port and open the other.

When the liquid is to be dispensed through the discharge spout 11, the actuating lever 48 is pivoted or moved to its lowered position as shown in Figures 2 and 6. This downward movement of the lever 48 causes the split gear 35 to be moved rearwardly and this results in the valve stems 19 and 21 rotating in opposite directions to thereby lift the valves 18 and 20 from the ports 16 and 17. Thus, with the valves 18 and 20 in the position shown in Figures 2, 3 and 6, the fluid will flow through the nipples 14 and 15, into the cavity 13 and out through the discharge spout 11. Further, the liquid mixing valve is so constructed that the temperature and volume of the resulting stream of liquid emitted by the discharge spout 11 can be controlled as desired. Thus, the actuating lever 48 is moved to its lowered position as shown in Figure 4, and then the actuating lever 48 is rotated in the proper direction. Rotation of the actuating lever 48 causes the gears 9 and 7 to rotate in opposite directions to thereby cause movement of the valve 18 and valve 20. Thus, one of the valves 18 or 20 can be moved into closing relation with respect to its respective port 16 or 17, while the other valve remains open so that the temperature of the water emitted by the discharge spout 11 can be controlled or regulated as desired.

Further, the gear arrangement is so constructed that excessive pressure on the gears will be prevented. Thus, the fulcrum post 43 projects into the slot 32 so that the post 43 is freely rotatable in the slot. Thus, the post 43 can move laterally to compensate for the turning motion of the split gear 35, thereby preventing excessive pressure on the intermeshing gears.

What I claim:

1. In a liquid mixing valve, a body having a pair of spaced ports for the ingress therethrough of separate liquid streams, there being a cavity in said body for receiving and mixing therein said streams, a valve mounted for movement into and out of closing relation with respect to each of said ports, a stem secured to each of said valves, a gear secured to each of said stems, there being an open ended slot arranged in the top of said body, a rotatable turn table supported on said body and having a split gear arranged in embracing relation with respect thereto, said split gear having teeth arranged in meshing engagement with the gears on said stems, and means for causing rotary and reciprocatory movement of said split gear to selectively move said valves into and out of bridging relation with respect to said ports.

2. In a liquid mixing valve, a body having a pair of spaced ports for the ingress therethrough of separate liquid streams, there being a cavity in said body for receiving and mixing therein said streams, a valve mounted for movement into and out of closing relation with respect to each of said ports, a stem secured to each of said valves, a gear secured to each of said stems, their being an open ended slot arranged in the top of said body, a rotatable turn table supported on said body and having a split gear arranged in embracing relation with respect thereto, said split gear having teeth arranged in meshing engagement with the gears on said stems, there being an opening in said turn table, a roller rotatably positioned in said opening, means connecting said roller to said turn table for reciprocating the latter, and manually operable means for moving said roller.

3. In a liquid mixing valve, a body having a pair of spaced ports for the ingress therethrough of separate liquid streams, there being a cavity in said body for receiving and mixing therein said streams, a valve mounted for movement into and out of closing relation with respect to each of said ports, a stem secured to each of said valves, a gear secured to each of said stems, there being an open ended slot arranged in the top of said body, a rotatable turn table supported on said body and having a split gear arranged in embracing relation with respect thereto, said split gear having teeth arranged in meshing engagement with the gears on said stems, there being an opening in said turn table, a roller rotatably positioned in said opening, means connecting said roller to said turn table for reciprocating the latter, and manually operable means embodying an actuating lever having one end secured to said roller for moving the latter.

4. In a liquid mixing valve, a body having a pair of spaced ports for the ingress therethrough of separate liquid streams, there being a cavity in said body for receiving and mixing therein said streams, a valve mounted for movement into and out of closing relation with respect to each of said ports, a stem secured to each of said valves, a gear secured to each of said stems, there being an open ended slot arranged in the top of said body, a rotatable turn table supported on said body and having a split gear arranged in embracing relation with respect thereto, said split gear having teeth arranged in meshing engagement with the gears on said stems, there being an opening in said turn table, a roller rotatably positioned in said opening, there being a pair of opposed slots in said split gear, a pin arranged off center with respect to said roller and carried thereby, said pin having its ends seated in the slots in said split gear, and manually operable means for moving said roller.

5. The apparatus as described in claim 3 and further including means on said turn table for limiting forward movement of said actuating lever.

KEEPERS M. NEWCOMER.

REFERENCES CITED

The following references are of record in the file of this patent:

UNITED STATES PATENTS

| Number | Name | Date |
|---|---|---|
| 2,453,809 | Newcomer | Nov. 16, 1948 |
| 2,464,458 | Newcomer | Mar. 15, 1949 |

FOREIGN PATENTS

| Number | Country | Date |
|---|---|---|
| 492,052 | Great Britain | 1937 |